United States Patent [19]

Cavanagh

[11] Patent Number: 4,808,893
[45] Date of Patent: Feb. 28, 1989

[54] STARTER PROCEDURE FOR PERMANENT MAGNET MOTORS

[75] Inventor: Patrick E. Cavanagh, Toronto, Canada

[73] Assignee: Maghemite Inc., Vancouver, Canada

[21] Appl. No.: 927,446

[22] Filed: Nov. 6, 1986

[30] Foreign Application Priority Data

Nov. 8, 1985 [GB] United Kingdom ............... 8527657

[51] Int. Cl.⁴ .............................................. H02P 6/02
[52] U.S. Cl. ...................................... 318/254; 318/138
[58] Field of Search ............... 318/138, 254, 431, 436, 318/439, 362, 368, 379

[56] References Cited

U.S. PATENT DOCUMENTS

| | | | |
|---|---|---|---|
| 3,854,080 | 12/1974 | Bambara et al. | 318/436 |
| 4,417,288 | 11/1983 | Hattori et al. | 318/371 X |
| 4,455,513 | 6/1984 | Fulton et al. | 318/254 X |
| 4,455,515 | 6/1984 | Uzuka | 318/254 |
| 4,584,505 | 4/1986 | Chung et al. | 318/138 X |
| 4,587,468 | 5/1986 | Hotta | 318/362 |
| 4,605,874 | 8/1986 | Whiteley | 310/156 X |
| 4,633,154 | 12/1986 | Maeda | 318/368 X |

FOREIGN PATENT DOCUMENTS 54-17218  2/1979  Japan ................... 318/362

*Primary Examiner*—Bentsu Ro
*Attorney, Agent, or Firm*—Sim & McBurney

[57] ABSTRACT

A procedure for stopping and starting a D.C. ferrite toroid motor so as to ensure that the rotor always rotates in the correct direction on starting. The windings in the stator are arranged in a plurality of circuits. Upon opening of the power switch to the motor, activation of one of the stator circuits only results in magnetic poles which attract the rotor poles, thereby slowing and stopping the rotor. Upon activation of the other of the stator circuits, an attractive stator pole is established ahead of a rotor pole and a repulsive stator pole is established behind the rotor pole, thereby ensuring rotation in the desired direction.

12 Claims, 10 Drawing Sheets

STARTER PROCEDURE FOR PERMANENT MAGNET MOTORS

FIELD OF INVENTION

The present invention relates to starter procedures for electric motors, more particularly for ferrite toroid motors, and to circuitry therefor.

BACKGROUND TO THE INVENTION

Ferrite toroid motors are a form of brushless D.C. motor and are fully described in U.S. Pat. No. 4,605,874, assigned to the assignee hereof, the disclosure of which is incorporated herein by reference. In such D.C. motors, a permanent magnet rotor has a plurality of magnetic poles and a stator bearing windings arranged to interact with the magnetic field produced by the magnetic poles to produce torque from D.C. current applied to the windings.

In one embodiment, the motor comprises a disk-like rotor element comprising a hard ferrite toroid providing a plurality of magnetic poles of alternating polarity and mounted for rotation about its axis and a disk-like stator element comprising a soft ferrite toroid and mounted coaxially with and spaced apart from the rotor. The soft ferrite toroid is formed with radially-directed coil winding receiving slots. Electrical coil windings are mounted to the stator element in the slots and each spanning one rotor pole pitch. The number of the radially directed coil winding receiving slots are a multiple of the number of magnetic poles of the rotor element. The electrical coil windings are series connected in the same multiple number of circuits which overlap each other in the winding slots. In one preferred embodiment of this motor, the motor has two circuits of stator windings and the stator has twice the number of poles present in the rotor.

SUMMARY OF INVENTION

The present invention provides a method of starting such a motor based upon properties of the array of magnets employed in the rotor and stator. In the present invention, the stator windings are arranged in a plurality of series-connected circuits which overlap one with another and are pulsed with current to establish poles of different polarity. Upon opening of the power switch to the motor, the rotor is braked to a stop by the activation of one of the stator circuits with the magnetic poles of the stator and those of the rotor in an attractive relationship. Upon closing the power switch to restart the motor, another stator circuit is activated so as to establish a desired relationship between the magnetic poles of the stator and those of the rotor, thereby starting the motor and ensuring that it always rotates in the same direction. In the desired direction of rotation, there will be an attractive stator pole ahead of a rotor pole and a repulsive stator pole behind the same rotor pole.

DESCRIPTION OF PREFERRED EMBODIMENT

Figure 1:
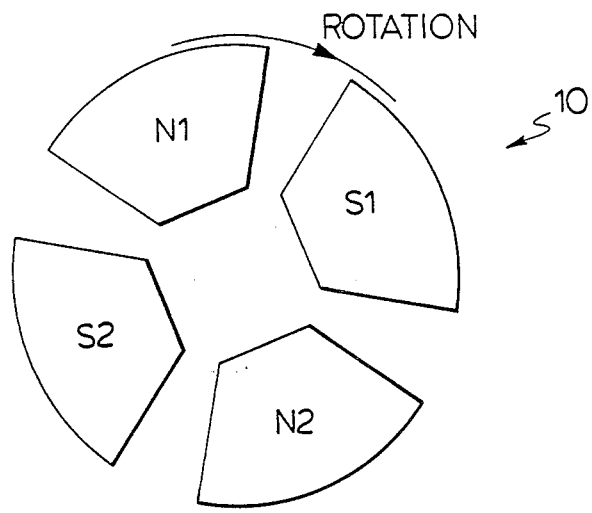
FIGS. 1 and 2 illustrate a 4-pole rotor and a 4-pole stator respectively of a ferrite toroid motor.
Figure 2:
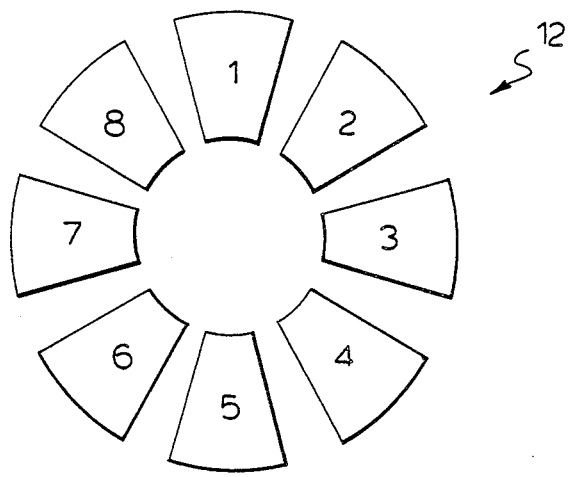

Referring to the drawings, FIGS. 1 and 2 illustrate the rotor 10 and stator 12 structures of one embodiment of the ferrite toroid motor. As may be seen, the stator 12 has twice the number of poles present in the rotor 10 and is intended for two-circuit operation. As discussed above, this data is provided with a plurality of windings which are arranged in independent alternately energized circuits. The windings in each circuit are provided as coils which each stand two rotor poles and may be designated Circuit I and Circuit II.

When the power is shut off, the motor coasts to a stop. The stator poles are not magnets when the current is off, but they are constructed of magnetic material, soft ferrite, and the rotor poles are attracted to them in the same way that they are attracted to a steel pole. The permanent magnets in the rotor come to rest at one of eight positions, namely the four positions shown in FIG. 3 and the corresponding positions with the north and south poles reversed. The rotor pole, being twice as large as the stator pole, always spans two stator poles.

Figure 3:
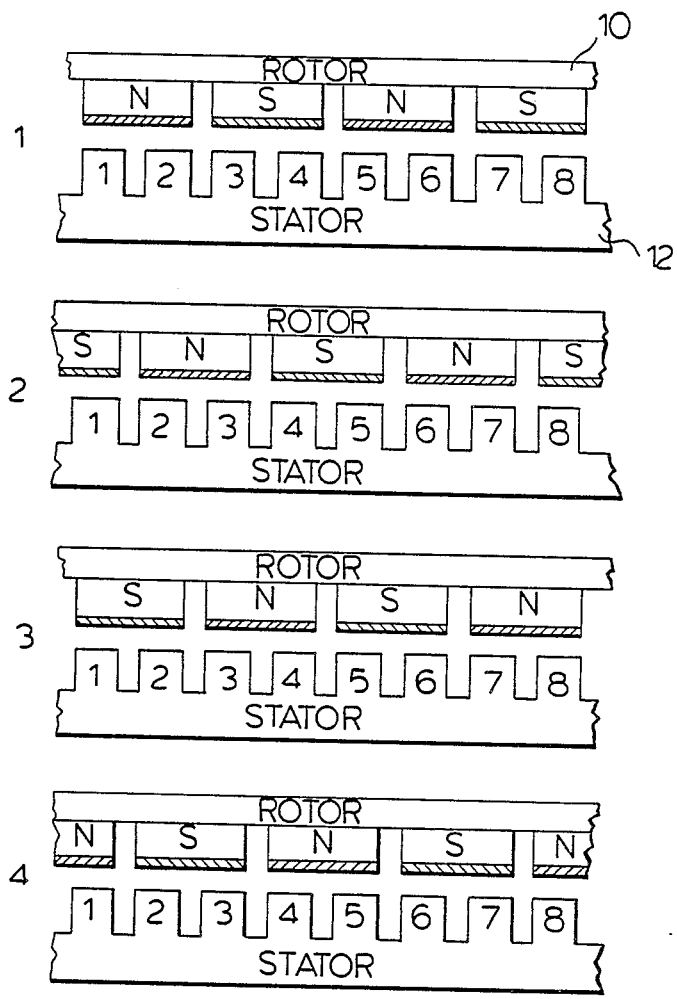
FIG. 3 illustrates four alternative full-stop positions for the motor.
Figure 4:
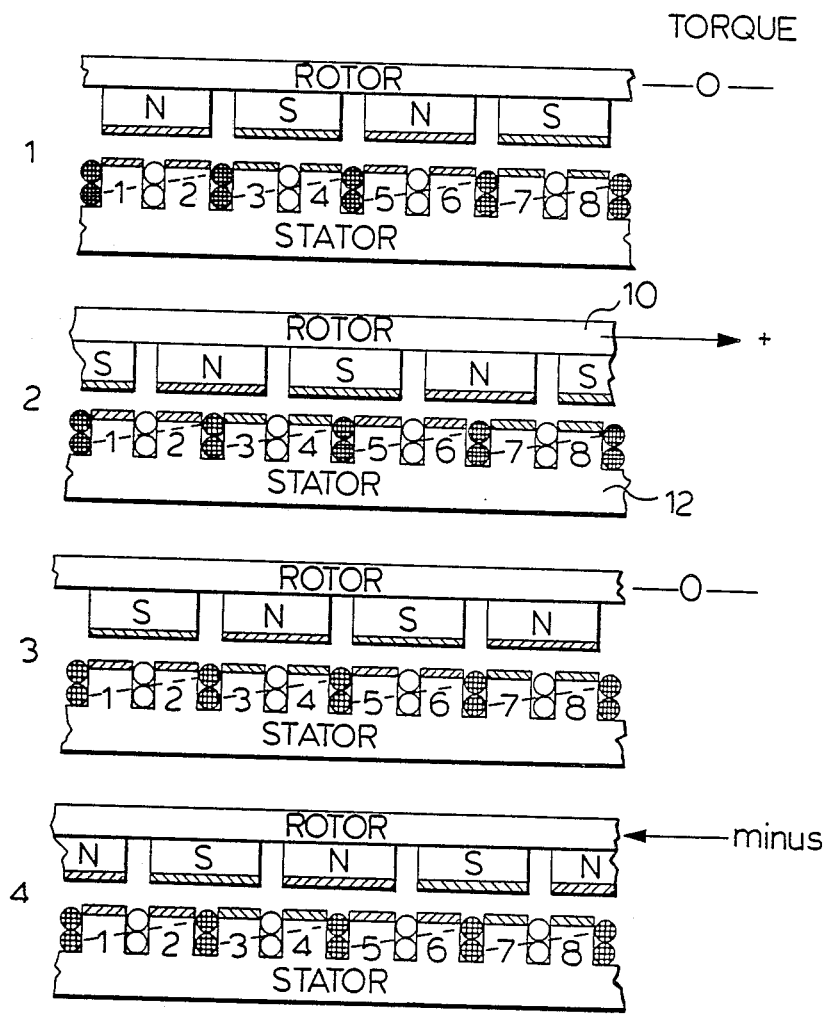
FIG. 4 illustrates the four positions of FIG. 3 and the effect of the turn on of circuit number I of the circuit.
Figure 5:
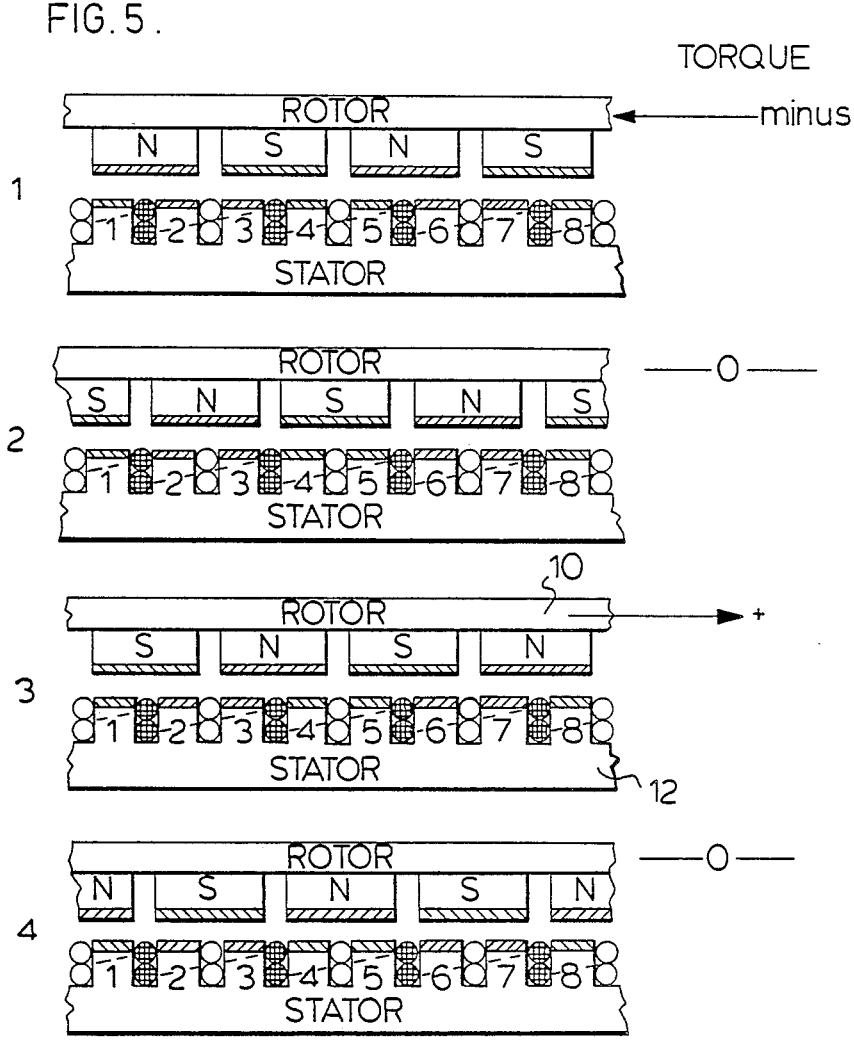
FIG. 5 illustrates the four positions of FIG. 3 and the effect of turn-on of circuit number II of the circuit.

Considering the positions in FIG. 3 after the motor has come to a stop and in conjunction with FIGS. 4 and 5, if circuit I of the motor is turned on, then in cases (1) and (3) no torque is developed since the respective north and south poles in the stator and rotor are aligned and hence the motor does not start. In case (2), stator pole pairs 1 and 2 and 5 and 6 repel the north poles in the rotor while the stator pole pairs 3 and 4 and 7 and 8 attract the north poles of the rotor. The same forces also act on the south poles in the rotor. In this way, a torque is developed which results in clockwise rotation of the rotor. In case (4), the effect is the same but the torque is opposite, and, therefore, the rotation is counter-clockwise.

A similar situation pertains if circuit II of the motor is turned on. In this event, in cases (2) and (4) no torque is developed and the motor will not start, in case (1) counter-clockwise rotation occurs and in case (3) clockwise rotation occurs. In each of the FIGS. 4 and 5 and also in FIGS. 6 and 7 below, the energized stator coils are shown in closed circles, while the unenergized coils are shown in open circles.

If it is desired to have the motor always start in the clockwise direction, then the conditions shown in FIG. 4(2) for circuit I or FIG. 5(3) for circuit II are used to ensure that this always happens, as described below.

In order to achieve these conditions, it is necessary to incorporate a braking circuit which ensures that the rotor 10 stops with its poles always in the position of FIG. 4(2) for a circuit I start or of FIG. 5(3) for a circuit II start.

Figure 6:
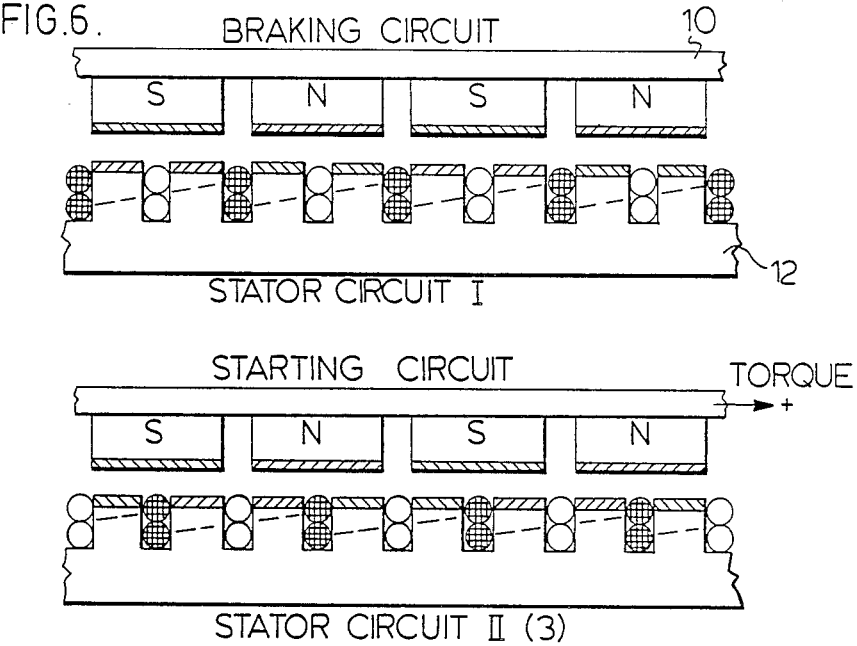
FIGS. 6 and 7 illustrate stop and start control operations for the ferrite toroid motor.

Taking the example of FIG. 5(3), in order to stop the rotor 10 with the poles in this position, then the stator 12 is energized to induce the poles to stop the rotor 10 in the desired position. The magnetization pattern of the braking stator circuit I stops the rotor in this position, as seen in FIG. 6 (see also FIG. 4(3)). Once the motor is stopped in this position, it can be restarted by energizing the stator so that circuit II is turned on first, as seen in FIG. 6 (see also FIG. 5(3)).

The reverse braking energization and start up energization can be used for the FIG. 4(2) start-up position. In this regard, see FIG. 7 and also FIGS. 5(4) and 4(2).

Once the rotor 10 is in motion, always in the clockwise direction, the operating circuits of the motor take over and rotation of the rotor 10 relative to the stator 12 continues.

The braking energy required to achieve braking to a stop in the desired polar relationship between the rotor 10 and stator 12 for restart may be provided in any convenient manner. It is preferred to provide a mechanical or electronic switch in the operating circuit of the motor, which is turned off while the motor is operating but, when power to the motor is shut off, which is closed and provides energy to one of the stator circuits so that the stator 12 is magnetized in one of the ways shown for the braking condition in FIGS. 6 or 7 so as to permit subsequent start up by initial activation of the other circuit.

Figure 7:
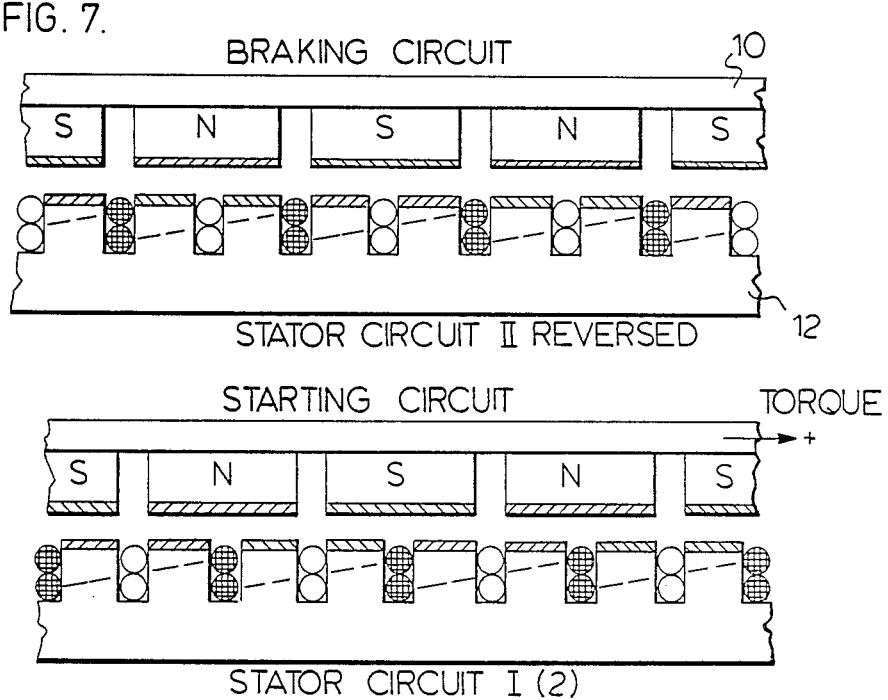

After the power is shut off, the rotor 10 continues to rotate for a short period of time. If one of the circuits is now connected through the switch to the other circuit with the correct voltage polarity, then the braking conditions of either FIGS. 6 or 7 are produced. Stored magnetic energy first is discharged as a transient which can be controlled or slowed down for best effect on the braking of the rotor. The counter EMF continues to be generated as the rotor slows down. Most rotors can be brought to a stop using the stored energy available after the power to the motor is turned off.

In some instances, stored energy cannot readily be handled for braking purposes. In such cases, the power source used to drive the motor is used to switch a controlled voltage onto the braking stator to produce the magnetic conditions shown in FIGS. 6 and 7. The braking switch remains on after the rotor has stopped in the desired position and hence it is necessary to incorporate a time delay unit in the circuit to turn off this source of voltage when the motor has stopped.

A variety of switches and circuitry may be adapted for braking and starting the motor. FIGS. 8 to 13 illustrate a variety of circuits which may be employed to produce the braking and starting conditions shown in FIGS. 6 and 7. In these embodiments, DPDT (double-pole double-throw) switches, which may be mechanical or electronic, Hall switches and trigger coil circuits are employed to achieve the desired results.

Figure 8:
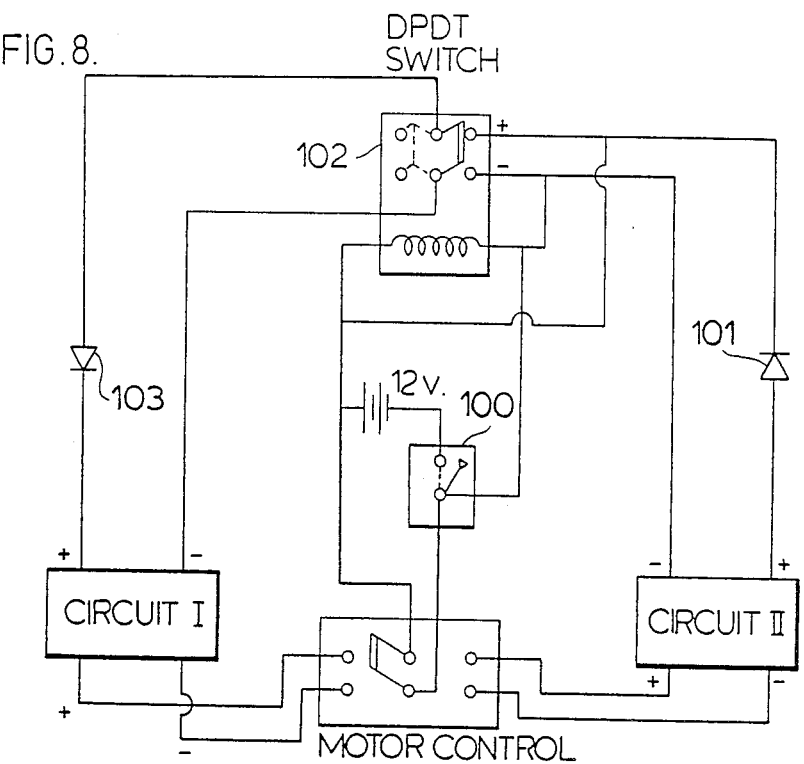
FIGS. 8 and 9 illustrate the control circuits for the braking and starting operations of FIGS. 6 and 7 respectively.

FIG. 8 shows a circuit in which, upon opening of a power switch 100, a DPDT switch 102 closes and then applies circuit II counter-EMF (CEMF) through diodes 101 and 103 to circuit I with the same voltage and polarity as circuit I when operating, so as to cause the rotor to be braked to a stop in the position shown in FIG. 6. Upon closure of the power switch 100 or start up, circuit I is activated, commencing clockwise rotation of the rotor, and then a trigger coil 104, provided in association with the DPDT switch 102, is energized by rotation of the motor magnets to open the DPDT switch 102.

Figure 9:
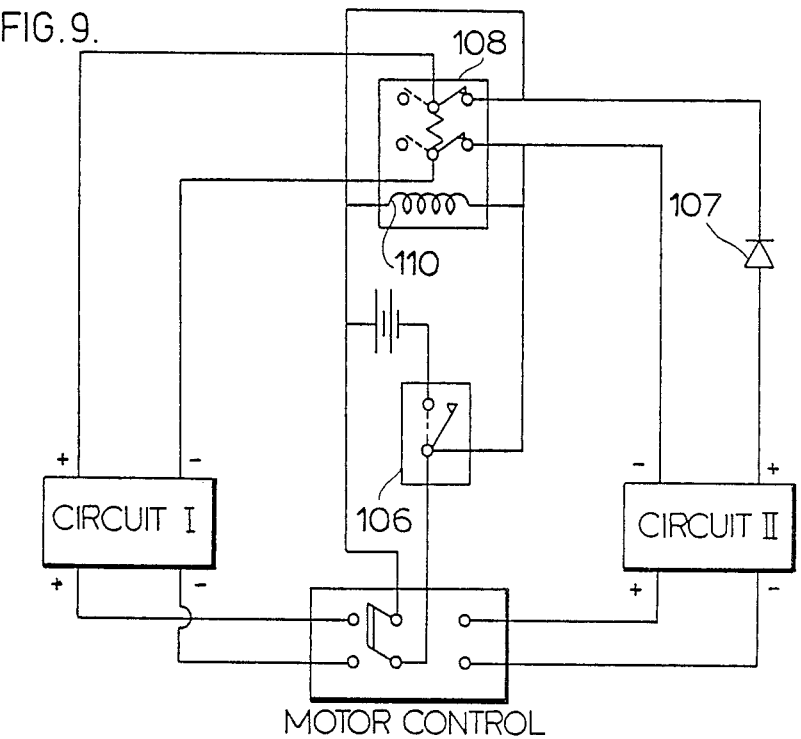

FIG. 9 circuit applies circuit II CEMF to circuit II through diodes 107 when the power switch 106 is opened and a DPDT switch 108 is closed, so as to cause the rotor to be braked to a stop in the position shown in FIG. 7. Upon closure of the power switch 106, circuit II is activated, commencing clockwise rotation of the rotor, and then a trigger coil 110, provided in association with the DPDT switch 108, is energized to open the DPDT switch 108.

Figure 10:
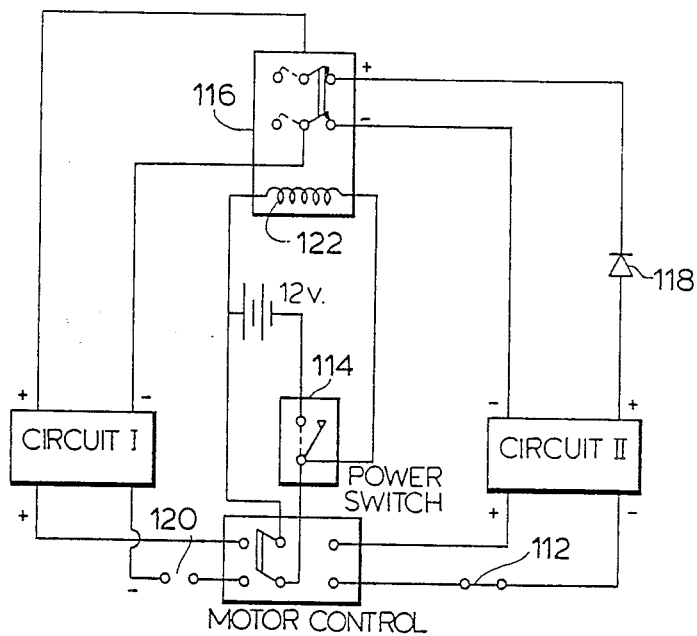
FIGS. 10 and 11 illustrate one form of the control circuits for the braking and starting operations of FIGS. 6 and 7 respectively.
Figure 11:
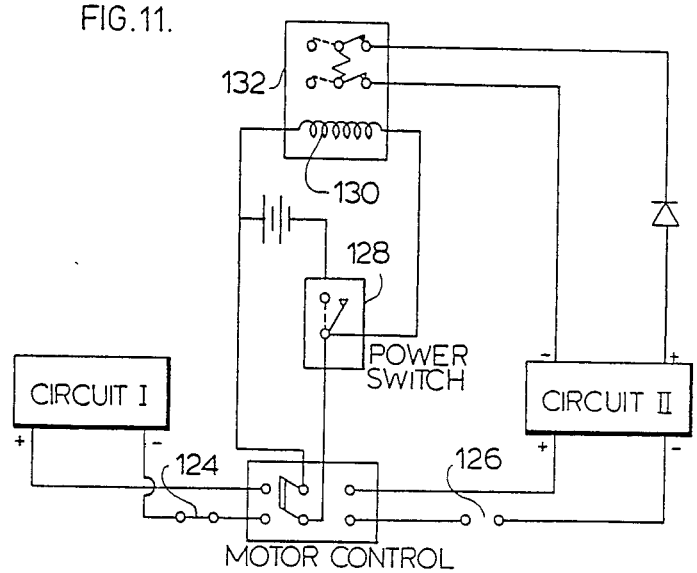

In FIGS. 10 and 11, magnetically activated Hall switches are included in the circuit. The Hall switches are mounted to the stator to be influenced, i.e. opened and closed, by the rotor magnets.

In FIG. 10, a first Hall switch 112 is connected to circuit II and is physically mounted to the stator between south poles 1 and 2 or 5 and 6 (see FIG. 4). As in the case of FIG. 8, upon opening of a power switch 114, a DPDT switch 116 closes and then applies circuit II CEMF through diode 188 to circuit I, as or to cause the rotor to be braked to a stop in the position shown in FIG. 6. In the stopped position, the Hall switch 112 is closed while a corresponding Hall switch 120 connected to circuit I is open. Upon closing the power switch 114, clockwise rotation of the rotor commences. A trigger coil 122 opens the DPDT switch 116.

In FIG. 11, a Hall switch 124 is connected to circuit I and is physically mounted to the stator between south poles 4 and 5 or 8 and 1 (see FIG. 5). This arrangement brakes the rotor to a stop in the position shown in FIG. 7, in the same manner as described above in connection with FIG. 9. In the stopped position, the Hall switch 124 is closed while a corresponding Hall switch 126 connected to circuit II is open. Upon closing of power switch 128, clockwise rotation of the rotor commences. A trigger coil 130 opens a DPDT switch 132.

Figure 12:
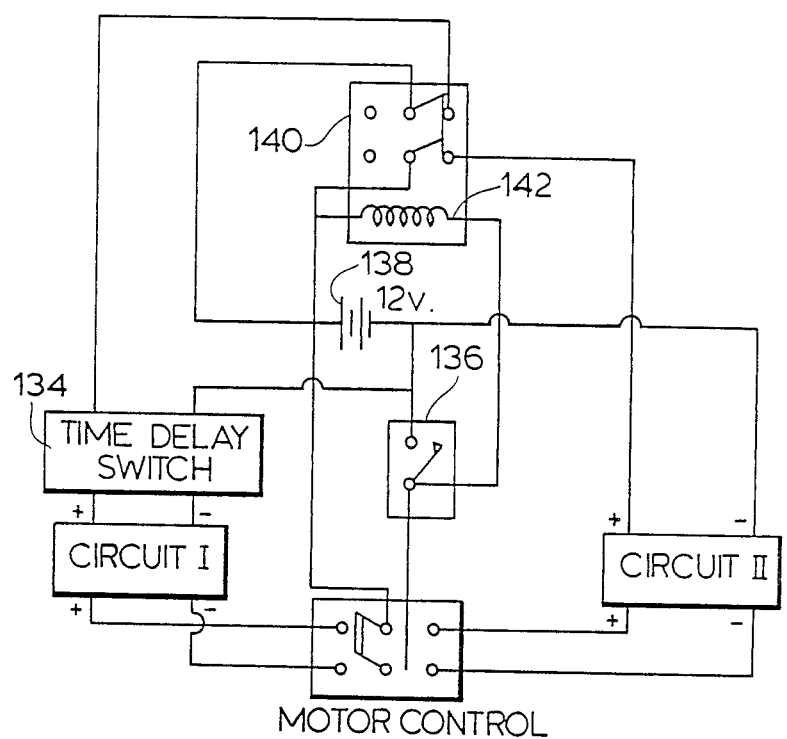
FIGS. 12 and 13 illustrate an alternate form of the control circuits for the braking and starting operations of FIGS. 6 and 7 respectively.
Figure 13:
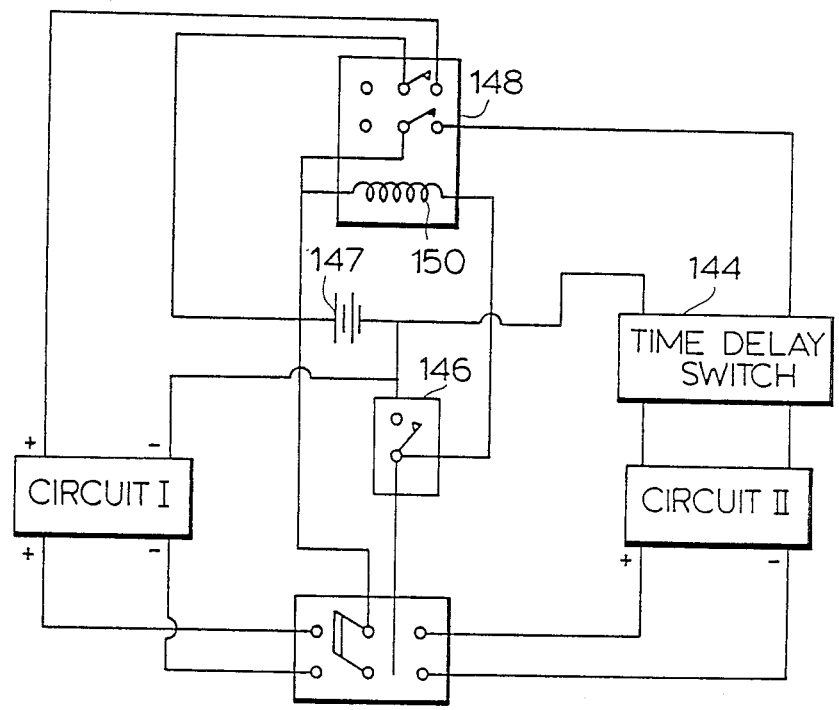

FIGS. 12 and 13 illustrates the use of battery braking to bring the rotor to stop in the desired position, either FIG. 6, using the circuit of FIG. 12, or FIG. 7, using the circuit of FIG. 13.

In FIG. 12, a time delay switch 134 is provided in the circuit, so that, when the power switch 136 is opened, power from the battery is maintained on circuit I until the rotor has stopped in the position shown in FIG. 6. The time delay switch 134 then opens the circuit. A DPDT switch 140 is closed when the power switch 136 is open. When the power switch 136 is opened, battery is connected through the DPDT switch to circuit II momentarily to commence rotation of the rotor and the trigger coil 142 opens the DPDT switch 140.

FIG. 13 shows a similar circuit, except that the time delay switch 144 is used in association with circuit II. In this case, opening of the power switch 146 allows energy from battery 148 to be circuit II to brake the rotor to a stop position as shown in FIG. 7. Upon closing the power switch 146, power is applied momentarily from the battery 147 to circuit one through DPDT switch 148, starts commencing rotation of the rotor, before trigger coil 150 opens the DPDT switch.

As can be seen from the above description of the circuits, the basic principle of the various circuits is that, upon switching the power off, energy is continued to be applied to one of the circuits to brake the rotor to a stop with a rotor pole attracted to a stator pole and hence a position from which rotation in the desired direction is achieved upon start up by momentarily energizing the other circuit, before the motor controls take over.

Figure 14:
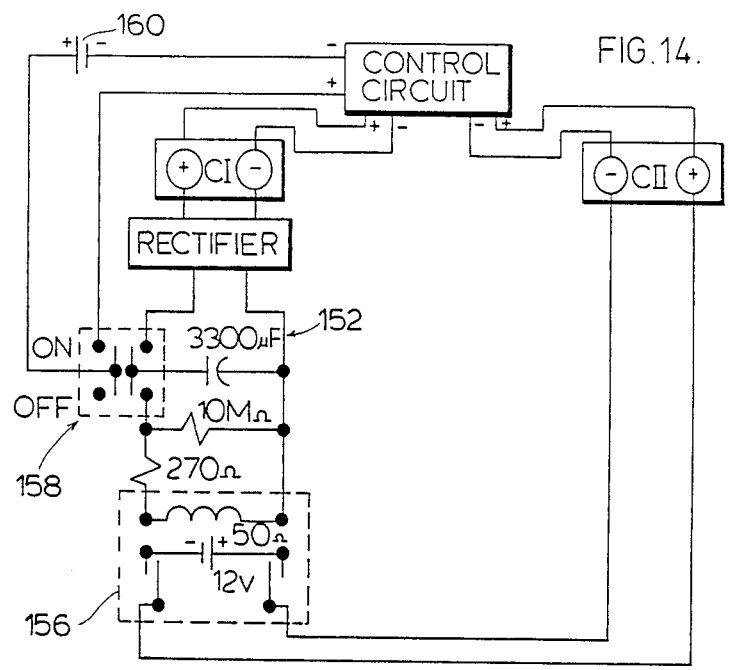
FIGS. 14 to 18 illustrate additional circuits and features.

FIG. 14 illustrates an arrangement employing a capacitor 152 and mechanical relay 156 and DPDT switch 158. In this arrangement, timed stopping energy from a battery 160, which may be separate from or the same as that used to power the motor, is applied to the stator to stop the motor at the desired position. The timing arrangement of the relay and capacitor may be readily adapted to the various circuit arrangements illustrated in FIGS. 8 to 13.

Figure 15:
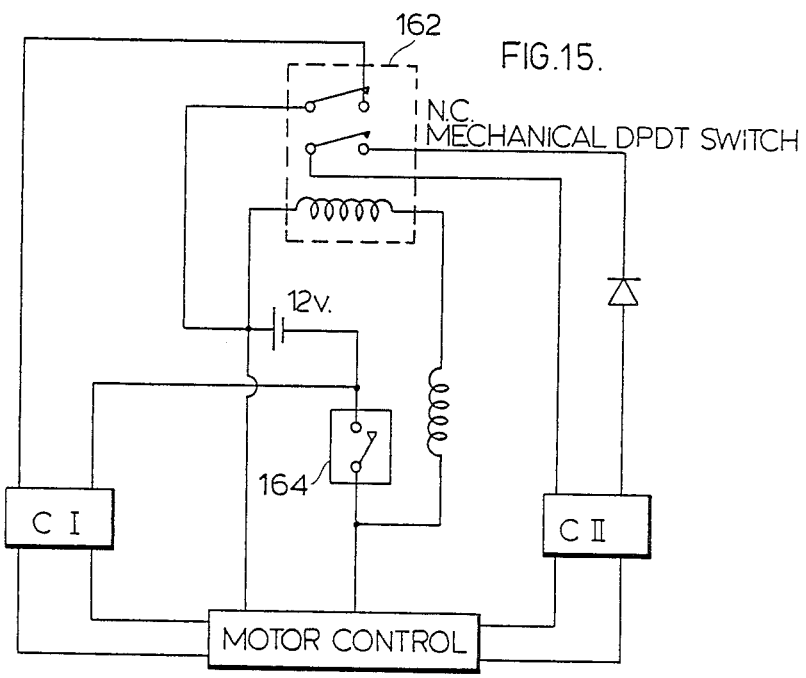

FIG. 15 illustrates an arrangement wherein a normally-closed DPDT switch 162 opens when the power is applied to the motor through switch 164. In this circuit, when the motor is turned off, the DPDT switch 162 closes and transfers energy from one coil circuit to the other to stop the motor in the desired position, in similar manner to that described for FIG. 8.

When the power switch 164 is closed, then, for a fraction of a second, as the switch is opening, power flows from the battery to circuit I to start the motor.

Figure 16:
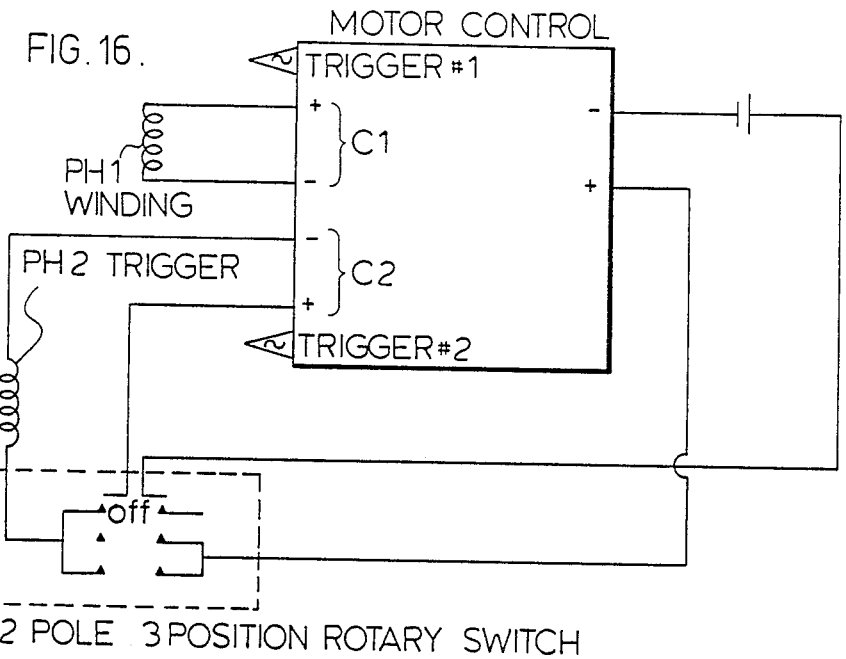

In FIG. 16, a three-position rotary switch, which requires spring operation or external start-up rotation, is incorporated which is employed to start the motor.

Figure 17:
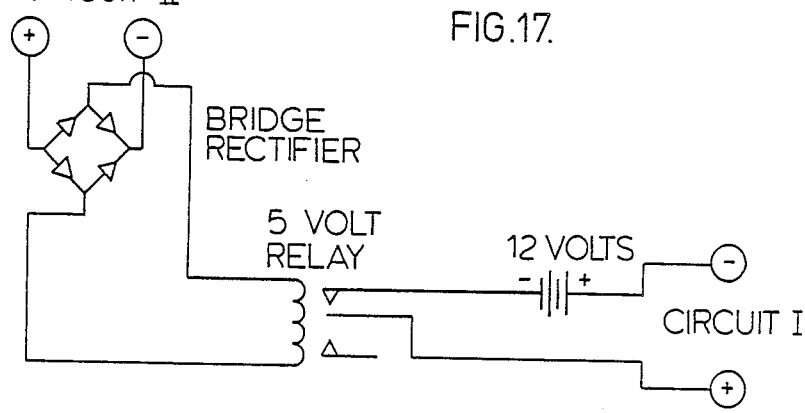
Figure 18:
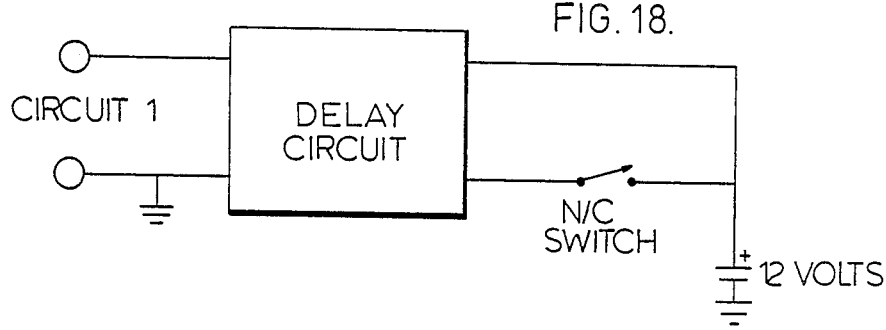

In FIG. 17, the counter EMF from circuit II is employed to close a relay switch and to supply battery power to stop the rotor at the required position for start-up. FIG. 18 is the same circuit as FIG. 17, incorporating a delay circuit for shutting off the power to circuit I after the motor has stopped.

SUMMARY OF DISCLOSURE

In summary of this disclosure, the present invention provides a novel procedure for ensuring that toroid permanent magnet motors can be started to rotate consistently in the same direction upon the application of power to the motor by activating one circuit of the stator winding to brake the rotor to a stop in a specific rotor relationship with the stator and then initially activating the other stator circuit so that the attractive and repulsive forces between the stator and rotor cause sufficient torque to develop to start the motor always in the same direction. A variety of specific circuits has been described to achieve this result in a two-circuit motor wherein the stator has twice the number of poles as are present in the rotor. The specific circuits are readily adaptable to other configurations and the specific circuits may be modified for such configurations, employing the underlying principles described herein. Modifications are possible within the scope of this invention.

What I claim is:

1. A method of controlling a brushless D.C. motor comprising a permanent magnet rotor having a plurality of magnetic poles and a stator bearing windings arranged to interact with the magnetic field produced by the rotor permanent magnet magnetic poles to produce torque from D.C. current applied to said windings, which comprises the steps of:
   arranging said stator windings in a plurality of series connected circuits which overlap one with another and are pulsed with current to establish electromagnetic poles of differing polarity,
   ceasing application of current to said windings and activating one of said circuits to brake said rotor to a stop with the electromagnetic poles of the stator and the magnetic poles of the rotor in an attractive relationship, and
   reestablishing application of current to another of said circuits to establish an attractive stator pole ahead of a rotor pole and a repulsive stator pole behind the same rotor pole, whereby said motor may be stopped and restarted always to rotate in the same direction.

2. The method of claim 1 wherein the number of stator poles is twice the number of rotor poles and two series-connected overlapping circuits are provided in the stator.

3. The method of claim 2 wherein said activation of said one circuit is effected by following said ceasing of application of current, further comprising the step of connecting said circuits together to establish a counter EMF in the circuits which is connected to pulsed D.C. to brake and stop the rotor.

4. The method of claim 2 wherein said activation of said one circuit is effected by continuing to apply current to only said one circuit when the application of current to the other of said circuits is terminated.

5. A method of control of a brushless D.C. motor to enable one-direction starting comprising:
   a disk-like rotor element comprising hard ferrite toroid means providing a plurality of magnetic poles of alternating polarity and mounted for rotation about its axis,
   a disk-like stator element comprising soft ferrite toroid means and mounted coaxially with and spaced apart from the rotor element, said soft ferrite toroid means being formed with radially-directed coil winding receiving slots in number twice that of the magnetic poles of the rotor element, and
   electrical coil windings mounted to said stator element in said slots and each spanning one rotor pole pitch, said electrical coil windings being series-connected in two series circuits which overlap each other in the winding slots; said method comprising, upon opening a power switch to the motor, the steps of braking the rotor element to stop by activation of one of the stator circuits with electromagnetic poles of the stator element and the magnetic poles of the rotor element in an attractive relationship, whereby, upon subsequent closing of the power switch, the other stator circuit is activated so as to provide an attractive stator pole ahead of a rotor pole and a repulsive stator pole behind the rotor pole.

6. In a brushless D.C. motor comprising a permanent magnet rotor having a plurality of magnet poles and a stator bearing windings to establish stator poles arranged to interact with the magnetic field produced by the permanent magnet magnetic poles of the rotor to produce torque from D.C. current applied to said windings, the number of said stator poles being twice the number of rotor poles, said windings being arranged in two series-connected circuits which overlap one another and are pulsed with current to establish poles of differing polarity, the improvement which comprises circuit means connecting said series-connected circuits together through a double-pole double-throw switch which is arranged to be actuated upon switch off of current to said circuits through a main power switch, whereby alternating counter EMF produced in one of said two series-connected circuits, by the relative rotation of the rotor to the stator is converted to pulsed direct current to induce a magnetic field on the stator poles in the other circuit to brake and stop the rotor with the stator poles attracting the rotor pole.

7. The motor of claim 6 wherein said circuit means is arranged to apply pulsed D.C. to the same circuit as that in which the counter EMF is generated and for D.C. current to be applied to the other circuit on subsequent start-up before said switch is opened.

8. The motor of claim 7 wherein said circuit means includes a Hall switch connected in series with said other circuit which is closed when said rotor is at rest and a Hall switch connected in series with said one circuit which is open when said rotor is at rest.

9. The motor of claim 6 wherein said circuit means is arranged to apply pulsed D.C. to the other circuit to that in which the counter-EMF is generated and for D.C. power to be applied to the counter-EMF circuit on subsequent start-up before said switch is opened.

10. The motor of claim 9 wherein said circuit means includes a Hall switch connected in series with said other circuit which is open when said rotor is at rest and a Hall switch connected in series with said one circuit which is closed when said rotor is at rest.

11. The motor of claim 6 wherein said double-pole double-throw switch is controlled by a trigger coil which opens and closes the double-pole double-throw switch as the main power switch to the winding circuits is closed and opened respectively.

12. The motor of claim 11 wherein said trigger coil is included in the stator circuit windings to provide a signal upon detected motion of said rotor.

* * * * *